United States Patent [19]

Rubbelke

[11] Patent Number: 5,161,414
[45] Date of Patent: Nov. 10, 1992

[54] MAGNETICALLY SHIELDED APPARATUS FOR SENSING VIBRATION

[75] Inventor: David L. Rubbelke, Rochester Hills, Mich.

[73] Assignee: Balance Engineering Corp., Troy, Mich.

[21] Appl. No.: 647,979

[22] Filed: Jan. 30, 1991

[51] Int. Cl.⁵ .............. G01H 11/02; G01B 7/14; G01N 27/72
[52] U.S. Cl. .................. 73/658; 336/84 M; 324/207.22; 324/207.26; 324/236; 324/262
[58] Field of Search ............ 324/207.12, 207.16, 324/207.22, 207.23, 207.24, 207.25, 207.26, 225, 226, 234, 236, 239, 260, 261, 262; 336/84 C, 84 M; 73/579, 658; 33/651

[56] References Cited

U.S. PATENT DOCUMENTS

| | | | |
|---|---|---|---|
| 3,510,852 | 5/1970 | Flanagan | 324/207.18 X |
| 3,609,527 | 9/1971 | Ellis | 324/207.18 |
| 3,707,671 | 12/1972 | Morrow et al. | 324/224 |
| 4,384,252 | 5/1983 | Kolter | 324/207.16 X |
| 4,479,389 | 10/1984 | Anderson, III et al. | 73/651 |
| 4,866,380 | 9/1980 | Meins et al. | 324/207.12 X |

Primary Examiner—Kenneth A. Wieder
Assistant Examiner—Warren S. Edmonds
Attorney, Agent, or Firm—Warren D. Hill

[57] ABSTRACT

A vibration detector for sensing imbalance of a part in a balancing machine uses an eddy current proximity detector for sensing vibration movement of a portion of the machine. To prevent spurious signals due to magnetic fields varying at the part rotation frequency, a mu-metal can is secured to the vibrating portion of the machine, an electrically conductive coupon is attached inside the can for vibrating movement therewith, and the proximity detector is spaced from the coupon by a small gap for producing AC signals representing the vibration amplitude.

8 Claims, 1 Drawing Sheet

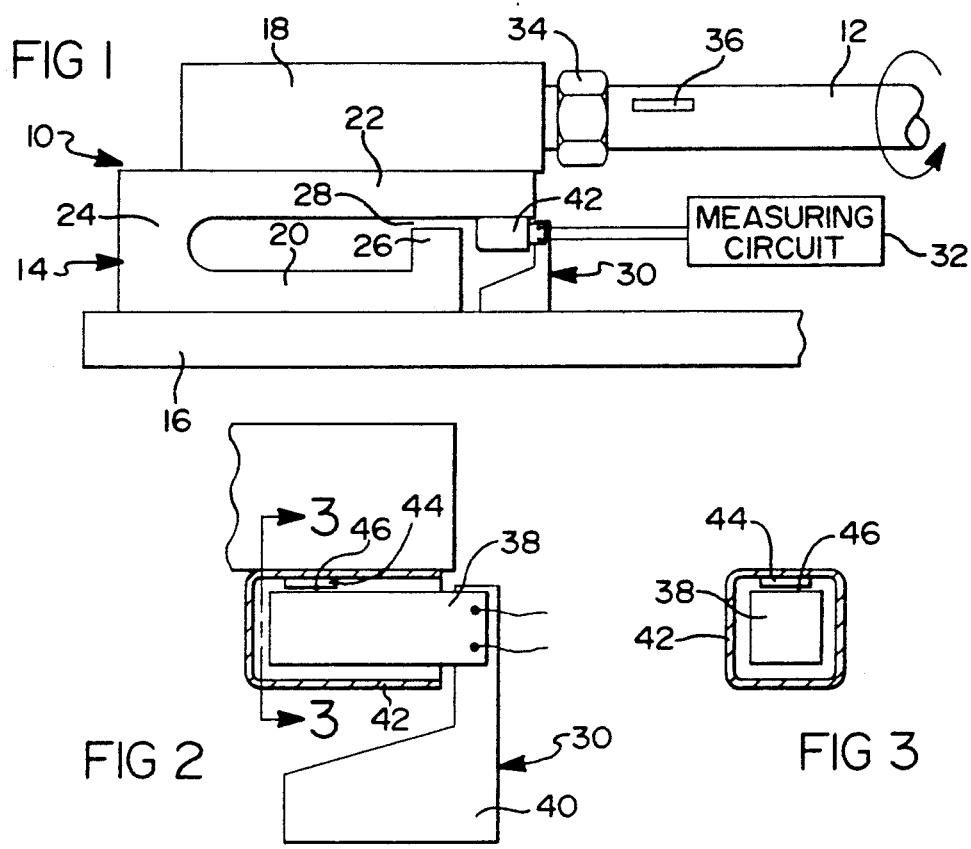
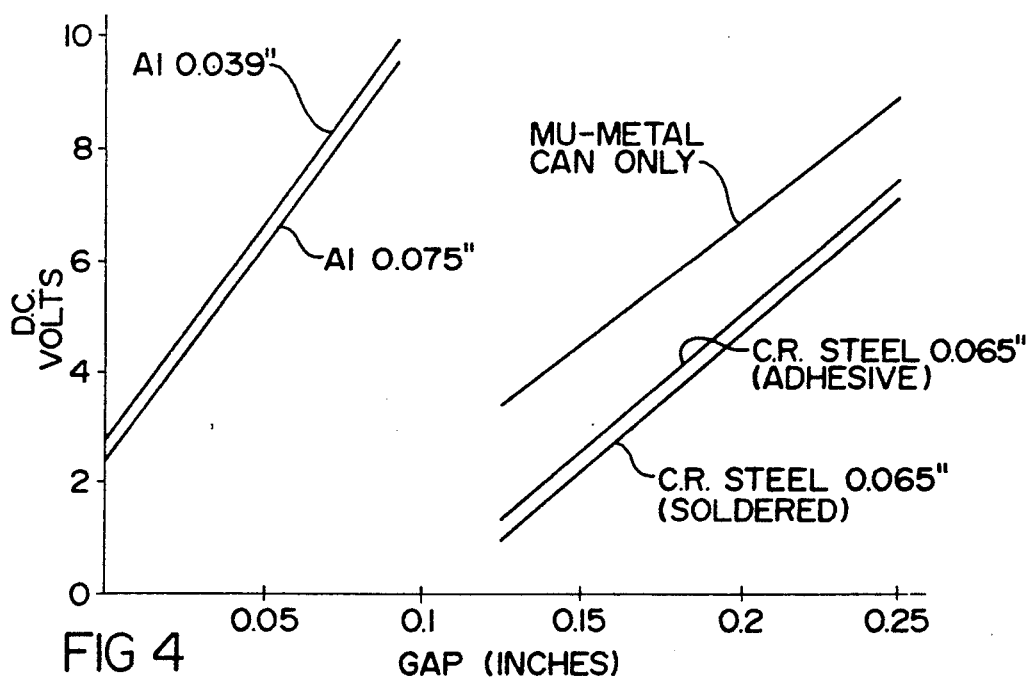

MAGNETICALLY SHIELDED APPARATUS FOR SENSING VIBRATION

FIELD OF THE INVENTION

This invention relates to vibration sensing apparatus and particularly to such apparatus incorporating magnetic shielding.

BACKGROUND OF THE INVENTION

In balancing machines for measuring and correcting the dynamic balance of rotary parts such as shafts, it is the usual practice to rotate the part, measure the phase and amplitude of any vibration which results from unbalance of the part, compute the amount and position of weight additions required to compensate for the unbalance, attach the weights, and make another balance measurement to verify that the part is corrected for unbalance. Often the weight attachment is effected by electrical welding.

To accommodate the vibration and allow its measurement, the balancing machine base structure is provided with a flexure region or suspension so that a portion of the machine vibrates with the rotating part and the vibration of the machine portion (which is otherwise stationary) can be measured to determine the part unbalance. Where the balancing machine has a stiff suspension, the amplitude of vibration to be measured may be very small, say, $2*10^{-6}$ inch. Thus it is required that the vibration sensing device be very sensitive, accurate, and linear as well. While a number of sensing devices have been used in the past, one which is particularly well suited to provide the listed requirements as well as repeatability and ruggedness is an eddy current proximity detector. Such a detector will reliably measure the vibration of the machine.

It has been found, however, that the welding procedure has the effect of magnetizing the part and even the machine tooling which supports the part. During part rotation, the residual magnetic field, in turn, causes the eddy current proximity detector to generate a signal which is indistinguishable from a vibration signal and thus yields erroneous readings. Since the magnetic field as well as the unbalance vibration varies with the rate of rotation, the magnetically induced signal has the same frequency as a vibration signal. Moreover, the amplitude of the spurious signal is in the range of measured vibration signals. Thus it is desirable to eliminate any confusion or error which may result from the magnetically induced signals.

SUMMARY OF THE INVENTION

It is therefore an object of the invention to provide a vibration detection apparatus using an eddy current sensor which is shielded from external magnetic fields. A further object is to provide a balancing machine having a magnetic shield for an unbalance detector.

The invention is carried out in a balancing machine for rotating a part to be tested and for sensing part vibration and which is subject to false vibration readings due to a magnetic field varying with the rotation of the part by magnetically shielded detector apparatus comprising: a magnetic shield enclosure of high permeability material mounted for vibration due to part unbalance; a metallic layer secured within the enclosure for vibration therewith; and an eddy current vibration detector within the enclosure for sensing vibration of the metallic layer and shielded from the magnetic field.

BRIEF DESCRIPTION OF THE DRAWINGS

The above and other advantages of the invention will become more apparent from the following description taken in conjunction with the accompanying drawings wherein like references refer to like parts and wherein:

FIG. 1 is a schematic diagram of a portion of a balancing machine equipped with a shielded detector according to the invention, FIG. 2 is an enlarged view, partially sectioned, of the detector arrangement of FIG. 1, FIG. 3 is a cross-sectional view taken along line 3—3 of FIG. 2, and FIG. 4 is a graph of detector response for different coupon materials to illustrate one aspect of the invention.

DESCRIPTION OF THE INVENTION

The ensuing description is directed to a vibration detector developed for use with a balancing machine, however, it should be recognized that the invention has application to vibration detectors in other environments. While the detector was developed to remedy spurious signals arising from external magnetic fields, the improved device also has significantly greater sensitivity, thereby suggesting its use whenever sensitivity is important, even where magnetic interference is not anticipated.

Referring to FIG. 1, which shows one end of a balancing machine 10 and one end of a part 12 to be balanced, the machine 10 has a frame 14 supported on a bed plate 16 and a spindle 18 carried by the frame 14. The frame 14 is generally U-shaped having a support leg 20 resting on the bed plate 16, a cantilever beam 22 holding the spindle 18, and a suspension or flexure portion 24 in the bight of the U which allows limited movement of the cantilever beam 22 with respect to the support leg 20. The end of the support leg 20 terminates in an abutment 26 which extends toward the beam 22 and is normally separated from the beam by a small gap 28 which defines the limit of the cantilever beam 22 deflection. Because the frame is typically a heavy casting the suspension is stiff and the amount of deflection or vibration is very small. Outboard of the abutment 26 a vibration detection apparatus 30 resting on the bed plate 16 extends toward the free end of the beam 22 and is electrically connected to a measuring circuit 32.

The part 12, which gives rise to the vibration to be measured, is held in a chuck 34 or other tooling which is rotatably carried by the spindle 18. If the part 12 is unbalanced, rotation of the part about its axis will cause unbalance forces at the frequency of rotation which are imparted to the cantilever beam causing the part and beam to vibrate at the rotation frequency. The amplitude and phase of the vibration determines the weight and location of a corrective mass. The slug 36 near one end of the part 12 is electrically welded to the part to make the correction. The welding current can magnetize the part as well as the tooling 34.

FIGS. 2 and 3 show the details of the vibration detection apparatus 30. An eddy current proximity detector or sensor 38 is supported by one end in cantilever fashion on a base 40. The detector 38 has an active portion near its free end on the surface opposed to the beam 22. A mu-metal can 42 open at one end is fastened by adhesive to the underside of the beam 22 for vibration therewith. The mu-metal can has a wall thickness of 0.026 inch, for example. A metal coupon 44 is secured on an inner wall of the can 42 in a region directly opposite the active portion of the detector 38 to define a gap 46 between the coupon and the active portion of the detector 38 such that the gap spacing varies with the vibration. The coupon may be, for example, one inch square and made of 0.065 inch thick cold rolled steel or 0.075 inch thick aluminum.

When the proximity detector is energized, an internal oscillator produces a high frequency current and a resultant magnetic field generates eddy currents in the nearby coupon. The detector circuitry senses the effect of the eddy currents and outputs a voltage which is dependent on the spacing from the detector. The vibration causes the gap to vary and thus an AC component of the output voltage is generated. The detector circuitry and operation are well known and need not be further described here.

During development of the detection apparatus it was found that if the detector 38 sensed the proximity of the beam directly, the magnetic field in the part and the tooling gave rise to spurious detector signals which mimicked a vibration signal. Since mu-metal has a high magnetic permeability and is known to be effective as a magnetic shield, the mu-metal can 42 was attached to the beam to surround the detector 38 to shield the detector from the magnetic field. The result of that shield configuration is that the spurious signals due to the magnetic field still occurred. A possible explanation for the failure of the mu-metal can to overcome the magnetic field problem is that since both the varying magnetic field from the rotating part and the field emanating from the detector create eddy currents in the mu-metal, and these eddy currents interfere in a way that affects the output of the detector 38.

The problem of the magnetically induced signal was finally solved by adding the metal coupon 44 to the inner wall of the can 42 with the result that the spurious signals were reduced to nearly zero. Specifically, 0.35 mv signals caused by the magnetic field were reduced to 0.007 mv. The addition of another conductive layer by attaching the metal coupon evidently allows the eddy currents to circulate without interference. It was found that high conductivity metal coupons were more effective in reducing the spurious signals than lower conductivity coupons.

FIG. 4 offers a comparison of static proximity detector 38 responses to different coupon materials in the mu-metal can as well as to no coupon. A Turck model LIU linear analog proximity sensor was used for the comparison tests and has an output from 0 to 10 volts which depends on the material and the spacing. The detector covered by a mu-metal can without a metal coupon installed yielded a linear output having a slope of about 45 mv/mil. Trials with a cold rolled steel coupon 0.065 inch thick soldered to the can and adhered to the can with silicon adhesive, respectively, yielded similar responses which have a slightly greater slope than the can without a coupon. Separate tests showed that the magnetically induced spurious signals were reduced by an order of magnitude when the steel coupons were used. Trials with aluminum coupons 0.039 and 0.075 inch thick, respectively, gave results similar to one another but having a greater slope of about 80 mv/mil. Using aluminum, the spurious signals were reduced to about one-fifth of those obtained with the steel coupons. The significance of the greater slope will be explained.

When the proximity detector is used as a vibration detector, the gap 46 is set to bias the DC output of the detector to a linear portion of its output, say 5 volts. Then only the AC component of the output signal is used as a measure of the gap changes due to vibration. Thus the DC offsets in the curves of FIG. 4 are unimportane. For a given vibration amplitude the AC voltage is a direct function of the slope of the response shown in FIG. 4. Thus the aluminum coupons yield a larger signal than either the steel coupons or the no coupon case. For the balancing machine of the type described herein, it is necessary to measure a vibration amplitude as small as $2*10^{-6}$ inch This corresponds to an AC signal of 0.16 mv when aluminum coupons are used and 0.09 mv when no coupons are used. Thus the use of conductive coupons in conjunction with the mu-metal cans not only dramatically reduces magnetically induced signals but also increases the detector sensitivity. In each case, high conductivity coupons provide greater benefits than low conductivity coupons.

The embodiments of the invention in which an exclusive property or privilege is claimed are defined as follows:

1. In a balancing machine for sensing vibrations of a rotating part and which is subject to false vibration readings due to a magnetic field varying with the part rotation, magnetically shielded detector apparatus comprising:

a magnetic shield enclosure of high permeability material mounted for vibration due to part unbalance;

an electrically conductive layer secured within the enclosure for vibration therewith; and an eddy current vibration detector within the enclosure for sensing vibration of the conductive layer, whereby the detector is shielded from the magnetic field.

2. A balancing machine for rotating a part to be tested and for sensing part vibration, the machine being subject to false vibration readings due to a magnetic field varying with the rotation of the part;

the machine having a bed plate and a movable portion which vibrates with the part;

a magnetic shield enclosure of high permeability material mounted on the machine and providing an inner space substantially free of the said magnetic field, an electrically conductive coupon within the enclosure and mounted for vibration with the movable portion; and an eddy current vibration detector mounted on the bed plate and disposed within the enclosure for sensing vibration of the conductive coupon and shielded from the magnetic field.

3. The invention as defined in claim 2 wherein the enclosure defines an inner wall and is mounted on the movable portion for vibration due to part unbalance; and the electrically conductive coupon is mounted on the inner wall of the enclosure for vibration therewith.

4. The invention as defined in claim 2 wherein the magnetic shield enclosure is a mu-metal can having an open end, and the vibration detector extends into the can through the open end.

5. The invention as defined in claim 2 wherein the magnetic shield enclosure is a mu-metal can having an open end and an inner wall; and the coupon is an aluminum plate mounted on the said inner wall.

6. A vibration detector for measuring the movement of a vibrating element, the detector having a sensor subject to erroneous readings when exposed to external magnetic fields, comprising:

an electrically conductive element mounted for vibration with the vibrating element;

a vibration sensor mounted adjacent to the conductive element and separated from the element by a gap for generating a signal representing the amount of vibration;

a magnetic shield surrounding the conductive element and the sensor for effectively protecting the sensor from external magnetic fields, and wherein the shield is mounted for vibration with the vibrating element and the conductive element is directly mounted on the shield.

7. A vibration detector for measuring the movement of a vibrating element, the detector having a sensor subject to erroneous readings when exposed to external magnetic fields, comprising:

an electrically conductive element mounted for vibration with the vibrating element;

a vibration sensor mounted adjacent to the conductive element and separated from the element by a gap for generating a signal representing the amount of vibration, wherein the vibration sensor is an eddy current proximity sensor which detects a varying gap between the conductive element and the sensor; and a magnetic shield surrounding the conductive element and the sensor for effectively protecting the sensor from external magnetic fields.

8. The invention as defined in claim 7 wherein the conductive element is an aluminum coupon and the magnetic shield is a mu-metal can.

* * * * *